United States Patent
Tada

(10) Patent No.: US 11,912,084 B2
(45) Date of Patent: Feb. 27, 2024

(54) VEHICULAR SHOCK-ABSORBING DEVICE USING WHEEL DEFORMATION MECHANISM

(71) Applicant: Shigeki Tada, Hyogo (JP)

(72) Inventor: Shigeki Tada, Hyogo (JP)

(*) Notice: Subject to any disclaimer, the term of this patent is extended or adjusted under 35 U.S.C. 154(b) by 372 days.

(21) Appl. No.: 17/299,397

(22) PCT Filed: Aug. 16, 2019

(86) PCT No.: PCT/JP2019/033593
§ 371 (c)(1),
(2) Date: Jun. 3, 2021

(87) PCT Pub. No.: WO2020/121604
PCT Pub. Date: Jun. 18, 2020

(65) Prior Publication Data
US 2022/0048351 A1    Feb. 17, 2022

(30) Foreign Application Priority Data

Dec. 10, 2018  (JP) ................. 2018-246109

(51) Int. Cl.
*B60G 17/00* (2006.01)
*B60B 3/08* (2006.01)
(Continued)

(52) U.S. Cl.
CPC .............. *B60G 17/00* (2013.01); *B60B 3/085* (2013.01); *B60B 9/04* (2013.01); *B60C 7/14* (2013.01);
(Continued)

(58) Field of Classification Search
CPC ................ B60G 17/00; B60G 2202/11; B60G 2800/01; B60B 3/085; B60B 9/04;
(Continued)

(56) References Cited

U.S. PATENT DOCUMENTS

| 11,591,032 B1* | 2/2023 | Willison | ................. B60K 1/04 |
| 2010/0000811 A1* | 1/2010 | Iwano | ................... B60G 7/008 |
| | | | 180/65.51 |

(Continued)

FOREIGN PATENT DOCUMENTS

| JP | 2009-061861 A | 3/2009 |
| JP | 2009-234568 A | 10/2009 |

(Continued)

OTHER PUBLICATIONS

Automobile Schoolbook; Chassis Structure I—3rd Edition; Japan Automobile Maintenance Colleges Association; Sankaido Publishing Co., Ltd.

(Continued)

*Primary Examiner* — Paul N Dickson
*Assistant Examiner* — Shams Dhanani
(74) *Attorney, Agent, or Firm* — BACON&THOMAS, PLLC

(57) ABSTRACT

[Technical Field] The present invention relates to a wheel deformation mechanism and a structure of a vehicular shock-absorbing device using the mechanism. [Technical Problem] In the conventional suspension device, there are problems that a vibration damping effect for an in-wheel motor vehicle is too low to alleviate an impact on the wheel and that a mounting space is required on the vehicle body side. There is a problem that since the conventional tire is poor in ability to absorb distortion of a contact patch caused by turning, the contact patch of the wheel is subjected to (Continued)

horizontal friction at the time of direction change. [Solution] An expansion and contraction mechanism as shown in FIG. 1 that connects two rotors and a band-shaped tread by a movable arm is incorporated in a wheel, [Main Use of Invention] The vehicle wheel is expanded and contracted by a rotation speed difference between the two rotors so as to control the posture of the vehicle body.

2 Claims, 2 Drawing Sheets

(51) Int. Cl.
    *B60B 9/04*     (2006.01)
    *B60C 7/14*     (2006.01)
    *B60C 11/00*     (2006.01)
    *B60K 7/00*     (2006.01)

(52) U.S. Cl.
    CPC ............... *B60C 11/00* (2013.01); *B60K 7/00* (2013.01); *B60G 2202/11* (2013.01); *B60G 2800/01* (2013.01)

(58) Field of Classification Search
    CPC ........... B60B 19/02; B60C 7/14; B60C 11/00; B60K 7/00; B60K 2007/0038; B60K 7/0007
    See application file for complete search history.

(56) References Cited

U.S. PATENT DOCUMENTS

| | | | |
|---|---|---|---|
| 2018/0056767 A1* | 3/2018 | Dolgov | B60G 3/145 |
| 2021/0194302 A1* | 6/2021 | Purchase | H02K 1/182 |
| 2022/0227168 A1* | 7/2022 | Schwaiger | B60K 7/0007 |
| 2022/0379676 A1* | 12/2022 | Joo | B60G 3/20 |

FOREIGN PATENT DOCUMENTS

| | | |
|---|---|---|
| JP | 2011-156906 A | 8/2011 |
| JP | 2015-039987 A | 3/2015 |

OTHER PUBLICATIONS

Patent Search Guidebook; Tire Structure; Japan Patent Office dated Mar. 2007.

\* cited by examiner

VEHICULAR SHOCK-ABSORBING DEVICE USING WHEEL DEFORMATION MECHANISM

TECHNICAL FIELD

The present invention relates to a wheel deformation mechanism and a structure of a vehicular shock-absorbing device using the mechanism.

BACKGROUND ART

As a damping mechanism of a conventional vehicle, particularly a damping mechanism of an automobile, there are used tires having elasticity as in Non Patent Literature 1 and a suspension device that connects a vehicle body and wheels as in Non Patent Literature 2.

CITATION LIST

Non Patent Literature

Non Patent Literature 1: Japan Patent Office, "Patent Search Guidebook-Tire Structure", p. 10, March 2007

Non Patent Literature 2: Japan Automobile Maintenance Colleges Association, "Chassis Structure 1, 3rd Ed. (Automobile textbook)", p. 149, Sankaido Publishing Co., Ltd., Apr. 5, 2004

SUMMARY OF INVENTION

Technical Problem

In a structure in which a suspension device is provided between wheels and a vehicle body, there are following problems: a damping effect is reduced when a heavy object such as a motor is mounted on the wheel; an impact on a device in the wheel cannot be alleviated; and a space for mounting the suspension device is required in the vehicle body side.

In principle, an electric vehicle using in-wheel motors can turn due to a rotation speed difference between right and left drive wheels. However, a conventional wheel structure using a tire has a poor ability to absorb distortion, of a contact patch, caused by turning, and thus has a problem that the contact patch of the wheel receives horizontal friction at the time of direction change.

Solution to Problem

A wheel is incorporated with an expansion and contraction mechanism as shown in FIG. 1 that uses a crank motion by an arm connecting between two rotors sharing a rotation shaft and a grounding portion of an outer periphery of the wheel.

A wheel is used that has a tread structure in which a plurality of band-shaped leaf springs are arranged.

Advantageous Effects of Invention

With a crank structure in which multiply divided tread and the two rotors are connected by the arms, a force applied to a part of the outer periphery of the wheel is uniformly transmitted to the entire outer periphery of the wheel, so that the outer diameter can be contracted while the round shape of the wheel is maintained.

Because a contraction mechanism of the wheel substitutes the function of a shock-absorbing device, the conventional suspension device is unnecessary.

In an automobile using the wheels, a vehicle height can be adjusted and a posture of the vehicle body can be controlled by individually accelerating or decelerating rotation of the two rotors by a power of each wheel or by a braking device so that the outer diameter of the wheel is temporarily expanded or contracted via the crank motion of the rotors and the arms.

Distortion of a wheel contact patch during turning of the vehicle is absorbed while being distributed to a plurality of parts due to distortion of a rubber tread that is multiply divided into band shapes and due to leaf springs supporting the shape of the tread.

DESCRIPTION OF EMBODIMENT

Figure 1:
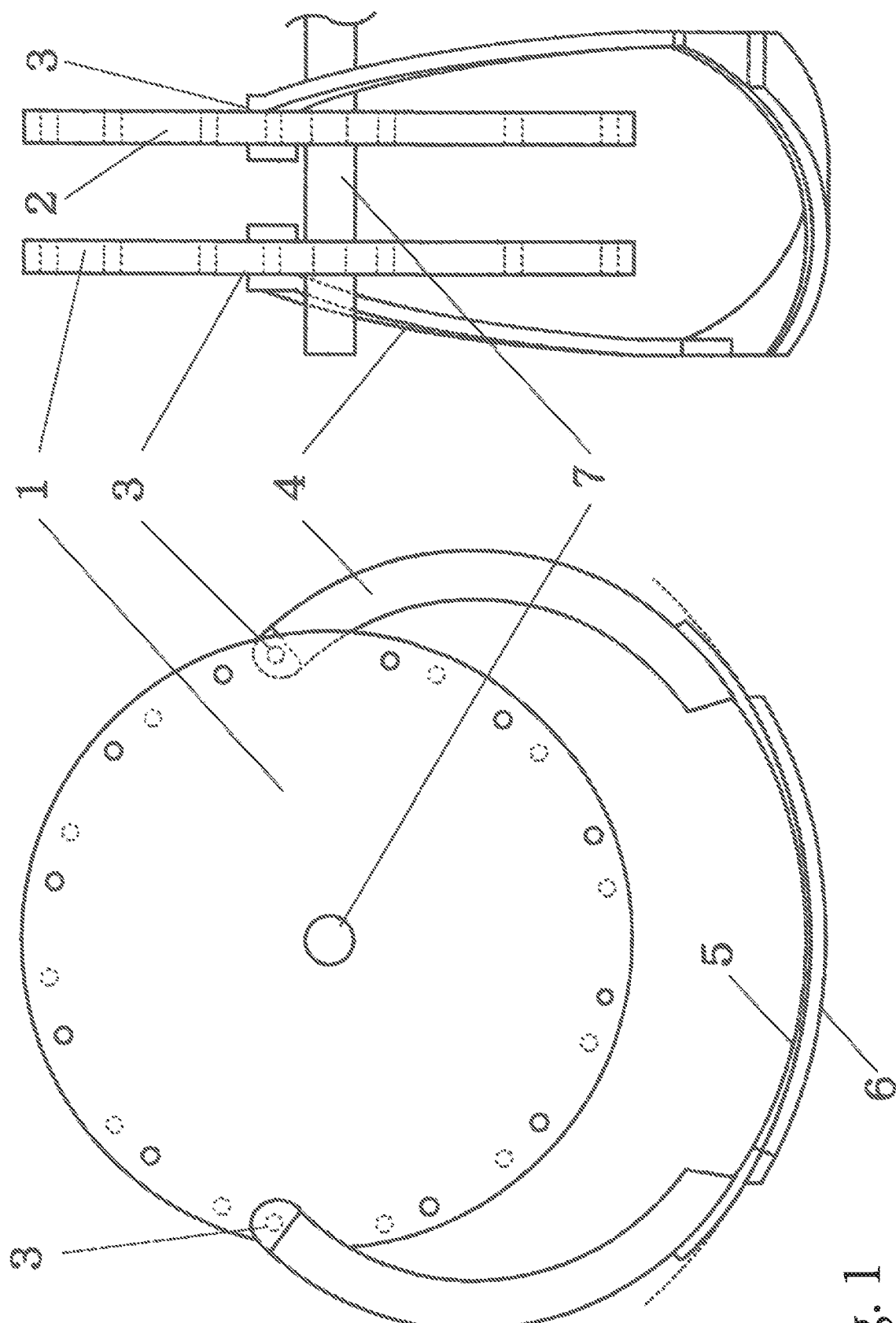
FIG. 1 is a side view and a rear view of a structure of a wheel on the left side of a vehicle body.

As shown in FIG. 1, two rotors (1) and (2) sharing a rotation shaft are connected by a U-shaped turn (4) via a hinge (3). Due to deformation of an arched leaf spring (5) along a circumference of a wheel, the arm is bent at the arm's central portion. The leaf spring also serves to maintain a shape of a tread, and a tread (6) made of rubber is attached to an outer surface of the leaf spring.

The arms are connected to the outer peripheries of the two rotors at equal intervals such that a plurality of leaf springs and treads are arranged in a spiral manner to surround the entire periphery of the wheel. For the sake of description, FIG. 1 illustrates a state where only one set of an arm, a leaf spring, and a tread is attached.

The shapes of the wheels on the left and right of a vehicle body are bilaterally symmetrical. FIG. 1 shows an example of the wheel on the left side of the vehicle body.

On the basis of the operation principle, the rotors (1) and (2) do not have to be attached to the same axle as long as the rotors' rotational planes are parallel to each other and the center lines of the rotation shafts coincide with each other.

As shown in FIG. 1, it is desirable that horizontal positions of the hinges when the center of the arm is right below the axle are slightly above the axle in a state where a standard load is applied to the wheel. This is because an outer shape of the wheel when the wheel is contracted can be maintained in a shape closer to a circular shape due to bending of the leaf springs. The closer the horizontal positions of the hinges and the axle are to each other, the smaller the deformation rate of the leaf spring with respect to the moving distance of the tread in the vertical direction can be kept.

When the wheel using the structure of FIG. 1 is rotating, if the rotation of the rotor (1) is decelerated or the rotor (2) is accelerated by using a motor or a braking device, an outer diameter of the wheel decreases, and if the rotation of the rotor (1) is accelerated or the rotor (2) is decelerated, the outer diameter of the wheel increases.

Figure 2:
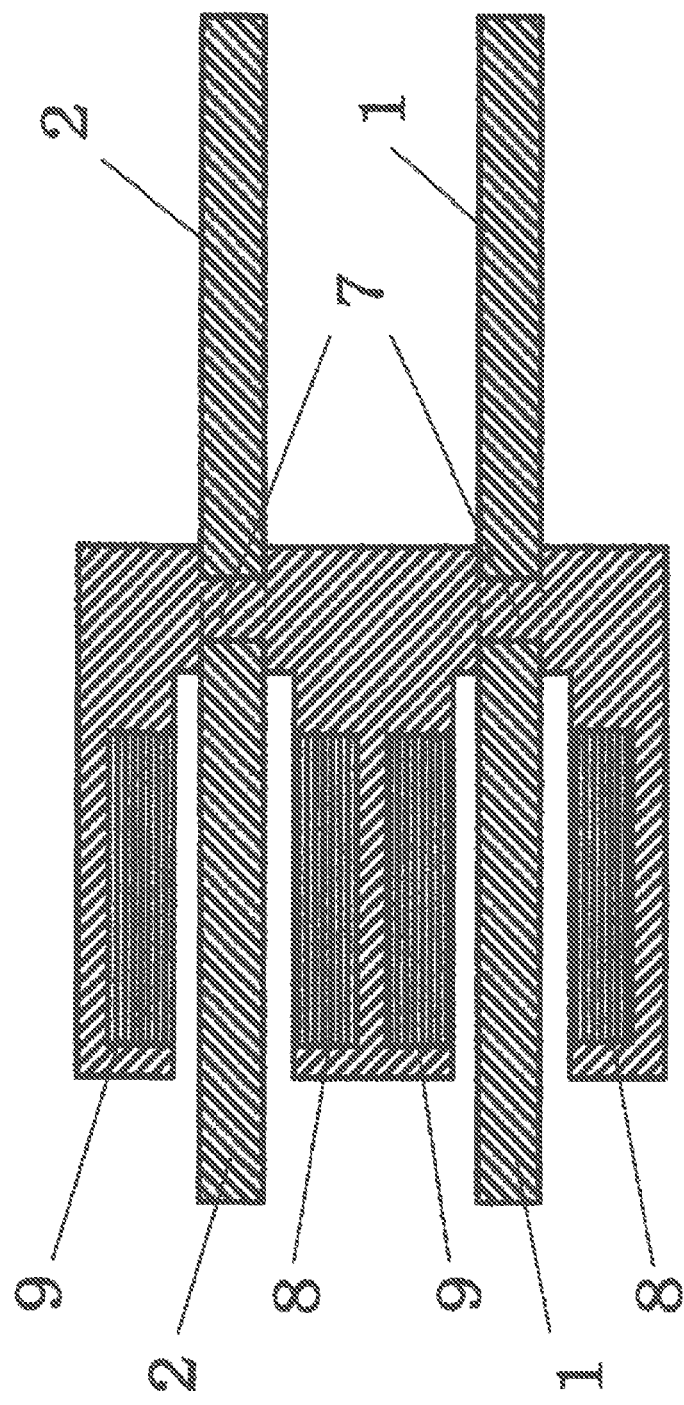
FIG. 2 is a cross-sectional view of a structure of a motor mounted on the wheel of FIG. 1.

FIG. 2 is a cross-sectional view illustrating an example of a layout in a case where two motors are attached to both the rotors (1) and (2) of FIG. 1. The left side in FIG. 2 corresponds to the front side of a vehicle, and the right side corresponds to the rear side. Coils of the stators are installed only in a half peripheral part on the front side of the vehicle body.

Either one of the two motors in FIG. 2 may be omitted.

The shapes of the wheels on the left and right of the vehicle body are bilaterally symmetrical. FIG. 2 is an example of the wheel on the left side of the vehicle body.

In a case where switched reluctance motors are used as the motors in FIG. 2, when the vehicle turns left forward or turns right backward, an output of a right-side stator (8) is decreased and an output of a left-side stator (9) is increased in proportion to a turning angle. Similarly, when the vehicle turns right forward or turns left backward, the output of the left-side stator is decreased and the output of the right-side stator is increased. When the drive method is used to incline a rotational force of the motors in a right or left direction with respect to the direction perpendicular to the axle, it is possible to offset and alleviate a load of a horizontal distortion that is applied to the axel and cannot be absorbed by the wheel when the vehicle body turns.

REFERENCE SIGNS LIST 1 outer rotor
2 inner rotor
3 hinge
4 arm
5 leaf spring
6 tread
7 axle
8 left side stator
9 right-side stator

The invention claimed is:

1. An expandable and contractable wheel structure comprising:
   two rotors that share a rotation shaft;
   a plurality of U-shaped arms each of which bends at a central part of the each arm, both ends of each arm being connected to respective ones of the two rotors;
   arc-shaped leaf springs connected between the U-shaped arms,
   treads, each attached to an outer surface of a respective leaf spring; and
   wherein the arc-shaped leaf springs and treads are arranged to surround a periphery of the wheel,
   wherein the two rotors and the U-shaped arms alleviate an impact and a vibration given to a vehicle from a road surface by converting the impact and the vibration into rotational kinetic energy of the rotors and, by a crank motion of the arms and the rotors, convert the rotational kinetic energy of the rotors into expansion and contraction of an outer diameter of the wheel,
   wherein curvature of an outer periphery of the wheel and a shape of the tread is maintained by causing by the arc-shaped leaf springs, and
   wherein the plurality of U-shaped arms and the tread are deformed to distribute and absorb a horizontal distortion applied to a wheel contact patch of the wheel when the vehicle turns.

2. A method for controlling a posture of a vehicle body, the method comprising:
   controlling the posture of the vehicle body by temporarily changing a vehicle height at a position where each wheel is mounted on the vehicle, by independently controlling a rotation speed of each of the rotors of claim 1 to temporarily expand or contract the outer diameter of the wheel via the crank motion of the rotors and the arms,
   wherein a power of the vehicle or a braking device is supplied to motors that are directly connected to each of the rotors to cause said temporary expansion or contraction of the outer diameter of the wheel.

* * * * *